United States Patent
Yan

(10) Patent No.: US 9,350,655 B2
(45) Date of Patent: May 24, 2016

(54) VERTICAL CONVERGED FRAMEWORK

(71) Applicant: Hangzhou H3C Technologies Co., Ltd., Hanghou, Zhejiang (CN)

(72) Inventor: Dehan Yan, Beijing (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 97 days.

(21) Appl. No.: 14/484,407

(22) Filed: Sep. 12, 2014

(65) Prior Publication Data

US 2015/0078392 A1    Mar. 19, 2015

(30) Foreign Application Priority Data

Sep. 13, 2013 (CN) .......................... 2013 1 0437977

(51) Int. Cl.
*H04L 12/775* (2013.01)
*H04L 12/937* (2013.01)
*H04L 12/931* (2013.01)
*H04L 12/935* (2013.01)

(52) U.S. Cl.
CPC ............ *H04L 45/583* (2013.01); *H04L 49/254* (2013.01); *H04L 49/3054* (2013.01); *H04L 49/356* (2013.01); *H04L 49/45* (2013.01); *H04L 49/65* (2013.01)

(58) Field of Classification Search
CPC .................................................... H04L 45/583
See application file for complete search history.

(56) References Cited

U.S. PATENT DOCUMENTS

| 5,541,911 A | 7/1996 | Nilakantan et al. |
| 7,458,092 B1 | 11/2008 | Parker et al. |
| 7,480,258 B1 * | 1/2009 | Shuen ............... H04L 45/00 370/217 |
| 8,438,307 B2 | 5/2013 | Wu et al. |
| 2006/0092853 A1 * | 5/2006 | Santoso ............ H04L 45/583 370/252 |
| 2007/0014234 A1 * | 1/2007 | Santoso ............ H04L 43/0817 370/216 |
| 2008/0130517 A1 | 6/2008 | Lee et al. |
| 2008/0137530 A1 * | 6/2008 | Fallis ............... H04L 49/45 370/216 |
| 2008/0155073 A1 * | 6/2008 | Swain ............... H04L 12/42 709/222 |
| 2008/0275975 A1 * | 11/2008 | Pandey ............. H04L 49/70 709/223 |
| 2011/0007670 A1 * | 1/2011 | Yan .................... H04L 12/42 370/255 |
| 2013/0046865 A1 | 2/2013 | Liu et al. |
| 2013/0100809 A1 | 4/2013 | Gale et al. |

(Continued)

FOREIGN PATENT DOCUMENTS

CN            103200092         7/2013

OTHER PUBLICATIONS

"Cisco Adapter Fabric Extender", Cisco Systems, Inc., Mar. 2011.

(Continued)

*Primary Examiner* — Redentor Pasia
(74) *Attorney, Agent, or Firm* — Mannava & Kang, P.C.

(57) ABSTRACT

According to an example, a Controlling Bridge (CB) receives a VCF registration request packet sent by a Port Extender (PE) and sets interface state of a VCF interface receiving the VCF registration request packet from initial state to blocked state. The CB returns a VCF registration response packet to the PE and receives a VCF registration acknowledge packet returned by the PE after the PE receives the VCF registration response packet. The CB sets interface state of a VCF interface sending the VCF registration request packet from blocked state to forwarding state; sets interface state of the VCF interface receiving the VCF registration request packet as forwarding state, and establishing successfully a VCF link with the PE.

12 Claims, 6 Drawing Sheets

(56) References Cited

U.S. PATENT DOCUMENTS

2013/0179879 A1 7/2013 Zhang et al.
2014/0247754 A1* 9/2014 Venkata .................. H04L 45/48
370/256

OTHER PUBLICATIONS

Cisco Nexus 2000 Series Fabric Extender Software Configuration Guide, Release 4.1, Cisco Systems, Inc., Jan. 16, 2009.

* cited by examiner ant application. In other instances, well-known methods, procedures, components, and circuits have not been described in detail so as not to unnecessarily obscure aspects of the examples. As used herein, the term "includes" means includes but not limited to, the term "including" means including but not limited to. The term "based on" means based at least in part on. In addition, the terms "a" and "an" are intended to denote at least one of a particular element.

VERTICAL CONVERGED FRAMEWORK

This application claims the benefit and priority of Chinese Patent Application No. 201310437977.5, filed on Sep. 13, 2013, in Chinese Patent Office, entitled "A method and device for building a vertical converged framework". The entire disclosure of the above application is incorporated herein by reference.

BACKGROUND

A Virtual Manufacturing (VM) host and migration thereof drives the development of the large-scale layer-2 network of the data center. With the expansion of the network scale, the number of network devices is growing, and the network management becomes a thorny issue in data center infrastructure management. At the same time, the modern large data center puts forward high requirements on port density which the network provides for the server, for example, the scale of ten thousand servers has been a common requirement in Internet data center. Port extension technology is one way of improving port density that has received industry recognition.

BRIEF DESCRIPTION OF THE DRAWINGS

For a better understanding of the present disclosure, reference should be made to the Detailed Description below, in conjunction with the following drawings in which like reference numerals refer to corresponding parts throughout the figures.

DETAILED DESCRIPTION

Figure 1:
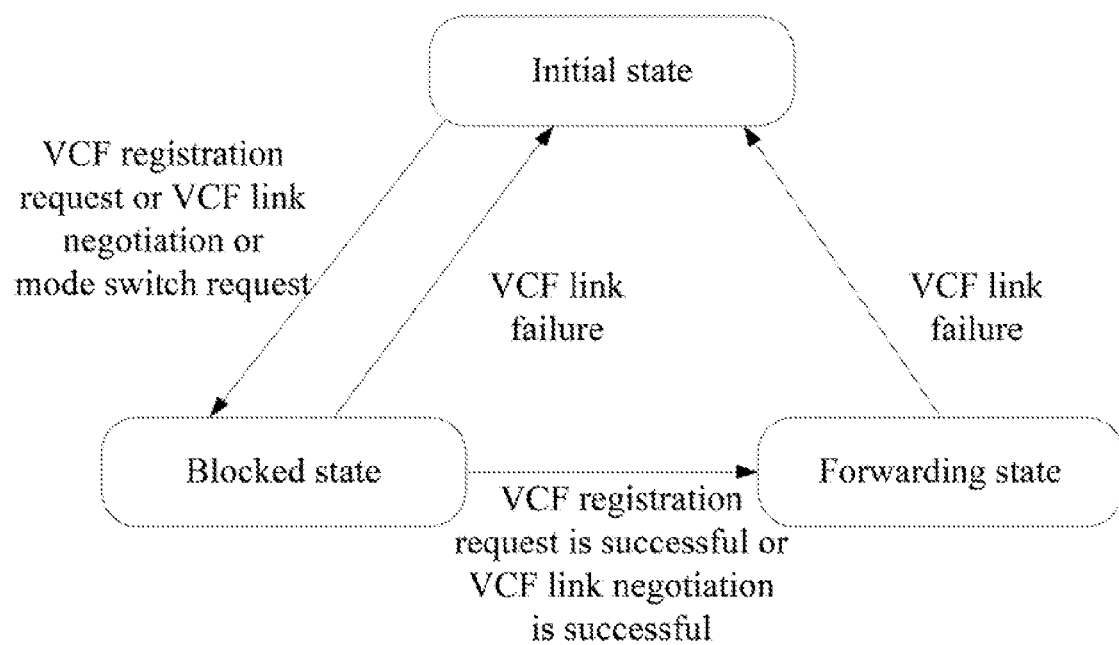
FIG. 1 is a schematic diagram illustrating an interface state machine supporting the Vertical Converged Framework (VCF) feature on Controlling Bridge (CB) side.

Reference will now be made in detail to examples, which are illustrated in the accompanying drawings. In the following detailed description, numerous specific details are set forth in order to provide a thorough understanding of the present application. Also, the figures are illustrations of an example, in which modules or procedures shown in the figures are not necessarily essential for implementing the present application. In other instances, well-known methods, procedures, components, and circuits have not been described in detail so as not to unnecessarily obscure aspects of the examples. As used herein, the term "includes" means includes but not limited to, the term "including" means including but not limited to. The term "based on" means based at least in part on. In addition, the terms "a" and "an" are intended to denote at least one of a particular element.

A Vertical Converged Framework (VCF) is a stacking system in which a plurality of devices, such as network switches, are stacked together and in which each device is assigned a role as either a Controlling Bridge (CB) which is a controlling device, or a Port Extender (PE), which is a vertical extension device. The PE may also be referred to as a remote interface board. Thus a VCF may comprise at least one CB and at least one PE. In some examples the CB may be at a first level in the network while the PE is at a second level in the network which is lower than the first level; for instance the CB may be in a core or aggregation layer, while the PE may be in an access layer of the network. In some examples the plurality of devices in the VCF may be managed as a single device.

In one example in VCF the PE device acts as a remote interface device of the CB device, thereby extending the I/O port capability of the CB device. The CB and PE may in some examples be managed centrally as a single device. In a VCF, a CB may for example be a switch device with strong processing capability, or may be a virtual system established by Intelligent Resilient Framework (IRF) or another virtualization technology which combines multiple physical switch devices at the same network level into a single virtual switch. A PE may for example be a low cost switch. In an example, the CB is a device, which will benefit from PE uplink redundancy.

A VCF interface is a physical interface connecting a CB and a PE. The VCF interface supports the VCF feature. After enabling the VCF feature, the VCF interface may forward preset encapsulated packets between the CB and the PE through a predetermined control protocol, thus the PE may be virtualized to appear to be an interface board of the CB, so that centralized management and centralized forwarding of packets may be performed. The predetermined control protocol may be IEEE 802.1br, or a private control protocol.

A VCF interface on the CB binds to a downlink group and is configured to connect a VCF interface of the PE. VCF interfaces binding to the same downlink group can only connect to the same PE. The VCF interface on the PE can only connect to the VCF interface, on the CB, binding to the same downlink group. A user may select to connect one or more VCF interfaces as required.

During the network formation, the PE may be run as a remote business board of the CB, that is, the PE is equivalent to a business board plugged in a specified slot of the CB. It is necessary to configure and allocate a management identifier for the business board on the CB. The management identifier is used to identify and manage the PE. For example, the management identifier may be a virtual slot number.

In a non-limiting example of the present disclosure, there may be multiple available interfaces supporting the VCF feature on both of the CB and the PE. On the CB side, the interface supporting the VCF feature has three interface states, namely initial state, blocked state and forwarding state. The transition of the three states is shown in FIG. 1, the initial state represents that the VCF feature of the interface is not activated, and the interface is only used as an ordinary business interface. The blocked state represents that the VCF feature of the interface is activated, but the interface is blocked and allows only a VCF protocol packet to pass, and does not allow a data packet to pass. The forwarding state represents that the VCF feature of the interface is activated and the interface allow all packets to pass.

Figure 2:
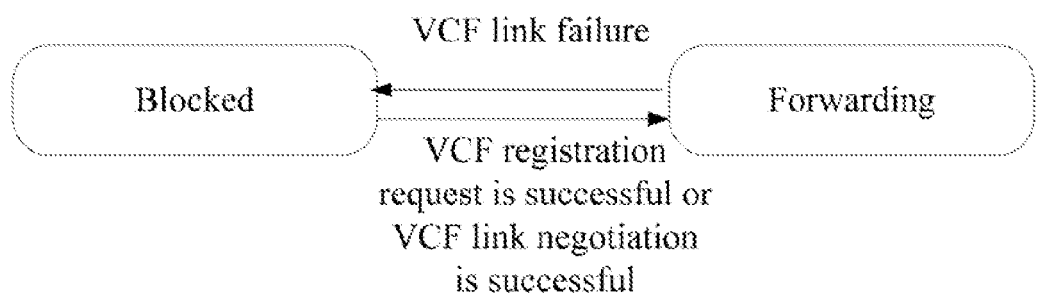
FIG. 2 is a schematic diagram illustrating an interface state machine supporting the Vertical Converged Framework (VCF) feature on Port Extender (PE) side.

On the PE side, the interface supporting the VCF feature has two interface states, namely blocked state and forwarding state. As shown in FIG. 2, the blocked state represents that the VCF feature of the interface is activated, but the interface is blocked and allows only a VCF protocol packet to pass. The forwarding state represents that the VCF feature of the interface is activated and the interface allow all packets to pass.

The VCF protocol packet may be a mode switch request packet, a VCF automatic switch packet, a VCF registration request packet, a VCF registration response packet, a VCF registration acknowledge packet, a VCF link negotiation packet, a VCF link addition packet, a VCF link addition acknowledge packet, a VCF link negotiation rejection packet, or the like.

The CB and the PE may correspondingly configure their interface state through the packet interaction between the interface of the CB and the interface of the PE, until the interface state is forwarding state, which means that the VCF link between the interfaces is established successfully.

Example embodiments will now be described more fully with reference to the accompanying drawings.

Figure 3A:
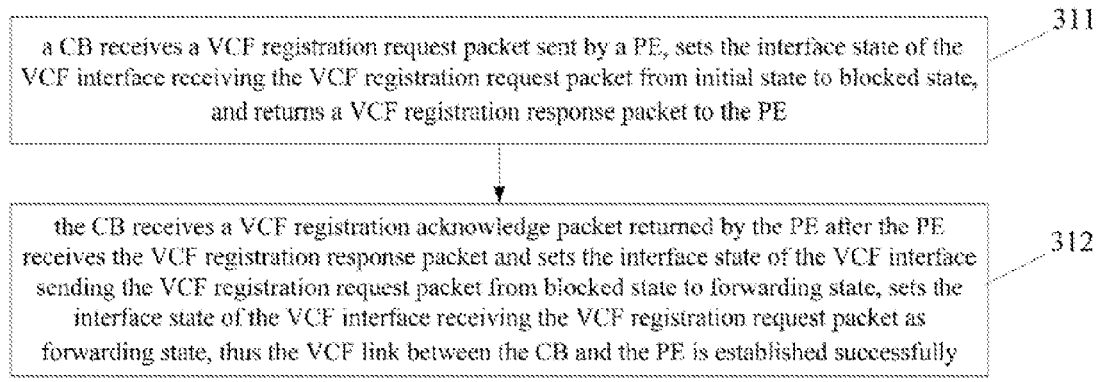
FIG. 3A is a flow diagram illustrating a method for building a VCF according to various embodiments of the present disclosure.

FIG. 3A is a flow diagram illustrating a method for building a VCF according to various embodiments of the present disclosure. Building a VCF means to set up or establish the VCF, for instance by setting certain VCF interface states and VCF links. As shown in FIG. 3A, the method may include the following operations.

In block 311, a CB receives a VCF registration request packet sent by a PE, sets the interface state of the VCF interface receiving the VCF registration request packet from initial state to blocked state, and returns a VCF registration response packet to the PE.

In a non-limiting example, the PE may send the VCF registration request packet through a VCF interface which is in blocked state (hereinafter called the first VCF interface) to a VCF interface which is in initial state (hereinafter called the second VCF interface) of the CB.

Here, the PE has been restarted, and all interfaces are in blocked state by default. The PE sends the VCF registration request packet to the CB in order to accomplish the registration request function, and simultaneously obtain a virtual slot number.

In addition, the VCF registration request packet carries a bridge Media Access Control (MAC) address of the PE. There is a one-to-one correspondence between a bridge MAC address and a PE, and the bridge MAC address is information for uniquely identifying the PE.

After receiving the VCF registration request packet, the CB may record the bridge MAC address of the PE, allocate a virtual slot number for the PE, and set the state of the virtual slot number as pre-allocation state, set the interface state of the second VCF interface receiving the VCF registration request packet from initial state to blocked state, and return the VCF registration response packet carrying the virtual slot number to the PE.

In an implementation, when allocating the virtual slot number for the PE, the CB may first inquire a group view of virtual slot numbers stored by the CB to determine whether there is a binding relationship corresponding to the bridge MAC address. When there is the binding relationship corresponding to the bridge MAC address, the CB may allocate a virtual slot number bound to the bridge MAC address to the PE; otherwise, the CB may select one unused virtual slot number from a virtual slot number pool, and allocate the selected virtual slot number to the PE.

It should be noted that, if a VCF link is established successfully between the CB and the PE, the restart of the PE may result in the break of the VCF link between the CB and the PE. In this case, the binding relationship, stored in the CB, between the bridge MAC address of the PE and the corresponding virtual slot number in the group view of virtual slot numbers will not be deleted. However, it is necessary for the PE to re-establish a VCF link with the CB, namely, the PE needs to resend a VCF registration request packet to the CB, and subsequently, the CB only needs to allocate the virtual slot number which is in the group view of virtual slot numbers and corresponds to the bridge MAC address to the PE, and does not need to allocate an unused virtual slot number to the PE.

In block 312, the CB receives a VCF registration acknowledge packet returned by the PE after the PE receives the VCF registration response packet and sets the interface state of the VCF interface sending the VCF registration request packet from blocked state to forwarding state, sets the interface state of the VCF interface receiving the VCF registration request packet as forwarding state, thus the VCF link between the CB and the PE is established successfully.

In various embodiments, when receiving the VCF registration response packet, the PE may record the virtual slot number, set the interface state of the first VCF interface from blocked state to forwarding state, and add the first VCF interface into an uplink group, send the VCF registration acknowledge packet to the CB through the first VCF interface.

In the uplink group, VCF interfaces, on the PE, each of which the interface state is forwarding state are recorded.

Figures 4, 5:
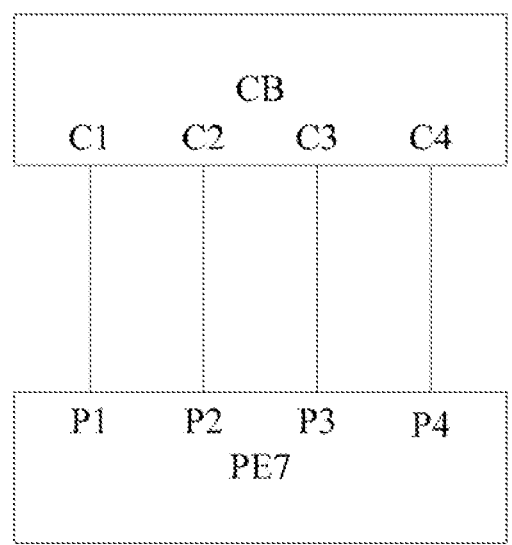
FIG. 4 is a schematic diagram illustrating group view of virtual slot numbers.
FIG. 5 is a schematic diagram illustrating a VCF system built by a CB device and a PE device.

After receiving the VCF registration acknowledge packet, the CB may set the state of the virtual slot number as allocated state, and set the second VCF interface as forwarding state, so as to establish a VCF link between the second VCF interface and the first VCF interface, add the second VCF interface into a downlink group, establish a binding relationship between a virtual slot number and a bridge MAC address, and store the binding relationship in a group view of virtual slot numbers. FIG. 4 is a schematic diagram illustrating the group view of virtual slot numbers. As shown in FIG. 4, virtual slot number 140 of the CB is bound to a bridge MAC address of PE1, virtual slot number 147 is bound to a bridge MAC address of PE5, virtual slot number 156 is bound to a bridge MAC address of PE7, virtual slot number 170 is bound to a bridge MAC address of PE9, and so on.

In the downlink group, VCF interfaces, on the CB, each of which the interface state is forwarding state are recorded. The CB side establishes the group view of virtual slot numbers shown in FIG. 4 in order to help supporting the hot plug. When it is necessary to unbind the binding relationship, the CB may perform an unbinding command on the group view of virtual slot numbers.

Figure 3B:
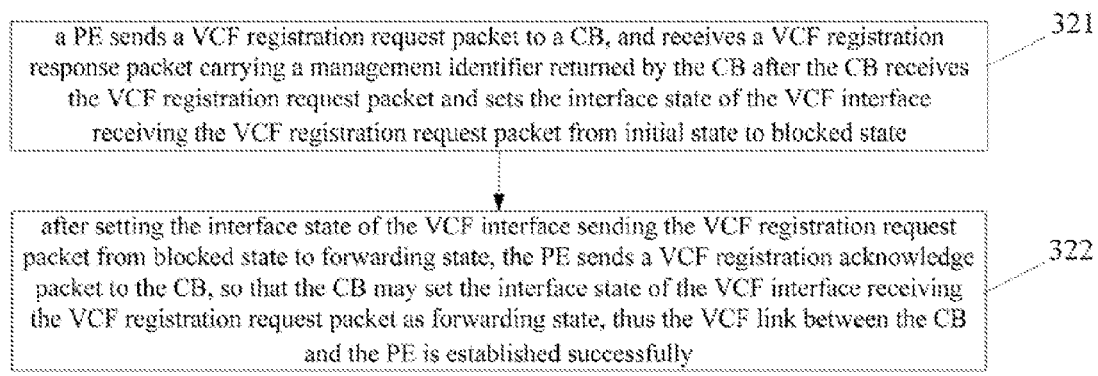
FIG. 3B is a flow diagram illustrating another method for building a VCF according to various embodiments of the present disclosure.

FIG. 3B is a flow diagram illustrating another method for building a VCF according to various embodiments of the present disclosure. As shown in FIG. 3B, the method may include the following operations.

In block 321, a PE sends a VCF registration request packet to a CB, and receives a VCF registration response packet returned by the CB after the CB receives the VCF registration request packet and sets the interface state of the VCF interface receiving the VCF registration request packet from initial state to blocked state.

In block 321, the specific operations of PE and CB may refer to the detailed description for block 311, and no further descriptions will be provided hereinafter.

In block 322, after setting the interface state of the VCF interface sending the VCF registration request packet from blocked state to forwarding state, the PE sends a VCF registration acknowledge packet to the CB, so that the CB may set the interface state of the VCF interface receiving the VCF registration request packet as forwarding state, thus the VCF link between the CB and the PE is established successfully.

In block 322, the specific operations of PE and CB may refer to the detailed description for block 312, and no further descriptions will be provided hereinafter.

The technical solutions of the present disclosure will be described with reference to two non-limiting examples.

In a first non-limiting example, suppose there are four links between the CB and PE7, and each of the four links corresponds to an interface supporting the VCF feature. As shown in FIG. 5, there are four interfaces supporting the VCF feature on the CB, namely interfaces C1, C2, C3 and C4, and there are four interfaces supporting the VCF feature on the PE7, namely interfaces P1, P2, P3 and P4. There is respectively a link between interfaces C1 and P1, interfaces C2 and P2, interfaces C3 and P3, and interfaces C4 and P4.

Figure 6:
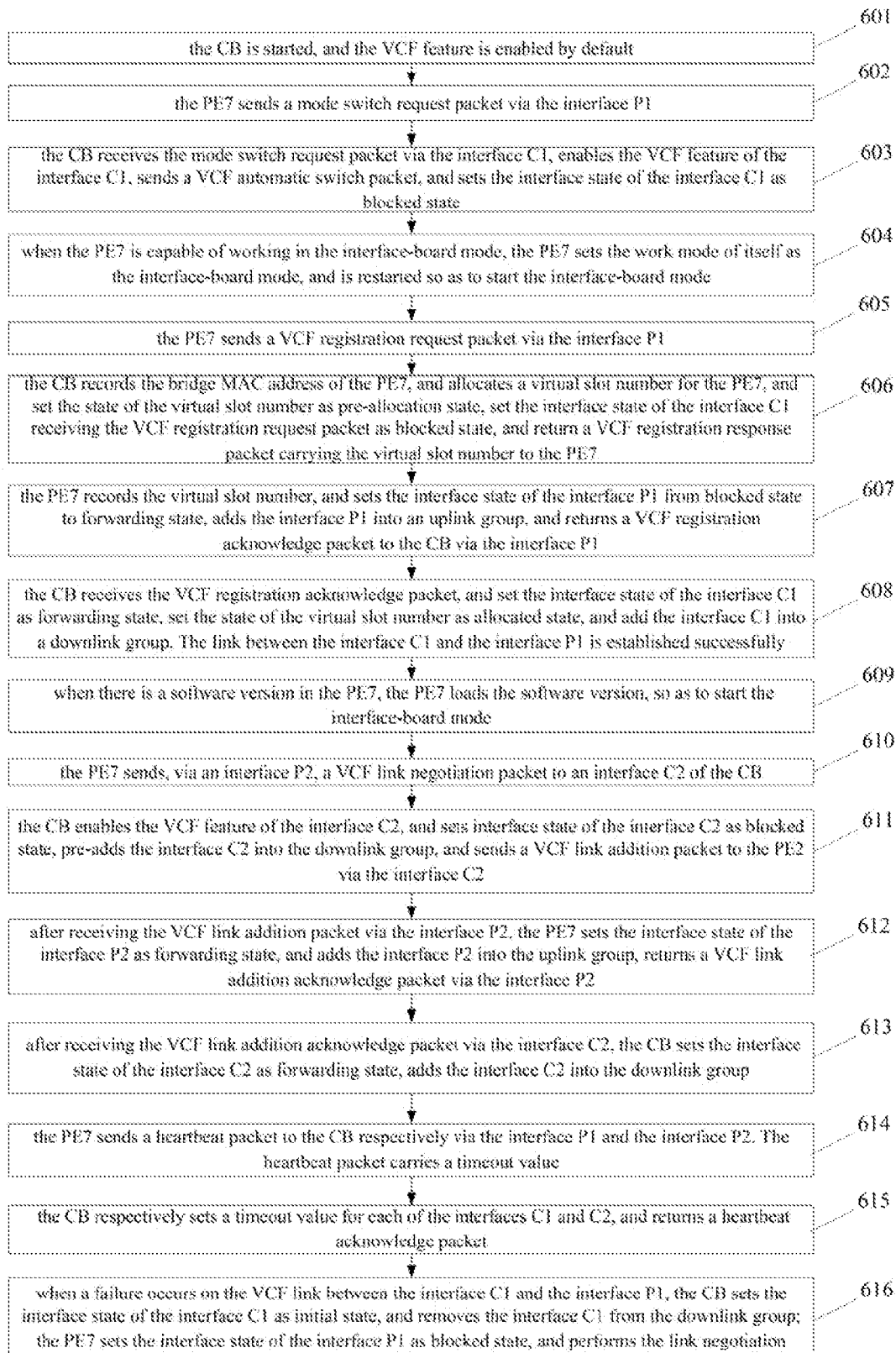
FIG. 6 is a flow diagram illustrating a method for building a VCF according to an example of the present disclosure.

How the CB and the PE7 automatically build a VCF system under zero configuration will be described with reference to FIG. 6, FIG. 6 is a flow diagram illustrating a method for building a VCF according to a non-limiting example of the present disclosure. The method may include the following operations.

In block 601, the CB is started, and the VCF feature is enabled by default.

The operation in block 601 may be achieved by starting the CB through a command-line switch, after the CB is started, the VCF feature is enabled.

In block 602, the PE7 sends a mode switch request packet via the interface P1.

The PE7 is generally in independent mode when delivery, when the PE7 is launched in the independent mode, it is necessary to switch the work mode of the PE7 from the independent mode to the interface-board mode. Here, the independent mode and the interface-board mode are relative terms. When as an independent unit, the device is not an expansion part of any control device, the device is in the independent mode. When the device is taken as a vertical expansion device of a control device, such as the CB, to achieve the port expander (or remote interface board) function of the CB, the device is required to run in the interface-board mode. It is necessary for the device to send a mode switch request when being switched from the independent mode to the interface-board mode. After being confirmed, the device is restarted so as to start the interface-board mode.

In the example, all of the four interfaces of the PE7 support the VCF feature, the PE7 may select any one of the four interfaces, for instance, select the interface P1. Similarly, if necessary, PE7 may stop sending the mode switch request packet via a command. It should be noted that, when the PE7 sends the mode switch request packet, it is necessary for the PE7 and the CB to enable Spanning—Tree Protocol (STP) to prevent initiating a loop between the PE7 and the CB.

In block 603, the CB receives the mode switch request packet via the interface C1, enables the VCF feature of the interface C1, sends a VCF automatic switch packet, and configures the interface state of the interface C1 as blocked state.

In block 603, since the interface P1 is connected with the interface C1, the CB receives the mode switch request packet via the interface C1, and then enables the VCF feature of the interface C1, and returns the VCF automatic switch packet to the PE7 via the interface C1, simultaneously configures the interface state of the interface C1 as blocked state.

In block 604, when the PE7 is capable of working in the interface-board mode, the PE7 configures the work mode of itself as the interface-board mode, and is restarted so as to start the interface-board mode.

In block 604, after receiving the VCF automatic switch packet, sent by the CB, via the interface P1, the PE7 determines whether the PE7 itself is capable of working in the interface-board mode, when the PE7 itself is capable of working in the interface-board mode, the PE7 configures the work mode of itself as the interface-board mode and is restarted.

In the example, since the four interfaces of the PE7 support the VCF feature, after the PE7 is restarted, the interface states of the interfaces P1, P2, P3 and P4 are blocked state by default.

In addition, the restart of the PE may result in the down of an interface, of the CB, of which the interface state is configured as blocked state in block 603, and the interface state of the interface is returned to the initial state.

Furthermore, when the PE7 determines that the PE7 itself is not capable of working in the interface-board mode, nothing is performed.

In block 605, the PE7 sends a VCF registration request packet via the interface P1.

In the example, the VCF registration request packet may be controlled and sent by BOOT software of the PE7. The BOOT software is similar to the Basic Input/Output System (BIOS) software in the Personal Computer (PC), and may be configured to provide the bottom and immediate hardware settings and control for the PE7, and may be configured to load software version (namely network operating system). The software version is similar to the windows operating system, refers to the software version capable of achieving the interface-board mode.

Since the PE7 starts the interface-board mode through above mentioned block 604, the BOOT software in block 605 may send the VCF registration request packet via an available interface capable of supporting the VCF feature on the PE7. The VCF registration request packet carries a bridge MAC address of the PE7. If the PE7 has multiple available interfaces, the BOOT software may first select one interface from the multiple available interfaces, and when the allocation is failure, select another one, until select one available interface. In the example, the four interfaces of the PE7 are available, and the interface state of each of the four interfaces is blocked state, therefore one of the four interfaces, such as the interface P1, is selected to send the VCF registration request packet.

In block 606, the CB records the bridge MAC address of the PE7, and allocates a virtual slot number for the PE7, and set the state of the virtual slot number as pre-allocation state, set the interface state of the interface C1 receiving the VCF registration request packet as blocked state, and return a VCF registration response packet carrying the virtual slot number to the PE7.

It should be noted that, when the PE7 sends the VCF registration request packet to the CB for the first time, there is no virtual slot number corresponding to the PE7 in the group view of virtual slot numbers on the CB side, in this case, the CB allocate an unused virtual slot number from the virtual slot number pool to the PE7. For example, the number resources in current virtual slot number pool are 100-200, an unused virtual slot number 156 is selected from the virtual slot number pool to be allocated to the PE7, and the state of the virtual slot number 156 is set as pre-allocation state, and the virtual slot number 156 is carried in the VCF registration response packet and sent to the PE7 via the interface C1.

In block 607, the PE7 records the virtual slot number, and sets the interface state of the interface P1 from blocked state to forwarding state, adds the interface P1 into an uplink group, and returns a VCF registration acknowledge packet to the CB via the interface P1.

Here, the PE7 records the virtual slot number 156 allocated by the CB, the current member of the uplink group is {P1}.

In block 608, the CB receives the VCF registration acknowledge packet, and set the interface state of the interface C1 as forwarding state, set the state of the virtual slot number as allocated state, and add the interface C1 into a downlink group. The link between the interface C1 and the interface P1 is established successfully.

Here, the CB set the state of the virtual slot number 156 from pre-allocation state to allocated state in order to prevent subsequently allocating the virtual slot number 156 to another PE, and guarantee the uniqueness between a virtual slot number and a PE. The CB further needs to establish a binding relationship between the bridge MAC address of the PE and the virtual slot number 156, and store the binding relationship in the group view of virtual slot numbers (as shown in FIG. 4). The current downlink group is {C1}.

In block 609, when there is a software version in the PE7, the PE7 loads the software version, so as to start the interface-board mode.

In the example, suppose the PE7 has a software version in local, the PE7 may directly load the software version to complete the starting of the interface-board mode. So far a link supporting the VCF feature has been established between the CB and the PE7, namely, the link between the interface C1 and the interface P1 is established. The link allows all packets to pass. When the PE7 starts the interface-board mode, the PE7 becomes a vertical expansion device of the VCF system.

In block 610, the PE7 sends, via an interface P2, a VCF link negotiation packet to an interface C2 of the CB.

In block 610, since there are other available interfaces supporting the VCF feature on the PE7, it is necessary for the PE7 to negotiate with the CB about other links supporting the VCF feature. In block 604, the interface states of all available interfaces supporting the VCF feature on the PE7 have defaulted to blocked states, and in block 607, the PE7 has obtained the virtual slot number 156 allocated by the CB, therefore, in block 610, the PE7 may send the VCF link negotiation packet carrying the bridge MAC address and the virtual slot number 156 used by the PE7 via an interface which is in blocked state. Here, interface P2 is taken as an example. The link negotiation process for interfaces P3 and P4 is similar to that for interface P2, no further descriptions will be given hereinafter.

In block 611, the CB enables the VCF feature of the interface C2, and sets interface state of the interface C2 as blocked state, pre-adds the interface C2 into the downlink group, and sends a VCF link addition packet to the PE2 via the interface C2.

In block 612, after receiving the VCF link addition packet via the interface P2, the PE7 sets the interface state of the interface P2 as forwarding state, and adds the interface P2 into the uplink group, returns a VCF link addition acknowledge packet via the interface P2.

Here, the current members of the uplink group are {P1, P2}.

In block 613, after receiving the VCF link addition acknowledge packet via the interface C2, the CB sets the interface state of the interface C2 as forwarding state, adds the interface C2 into the downlink group.

Here, the current members of the downlink group are {C1, C2}.

In block 614, the PE7 sends a heartbeat packet to the CB respectively via the interface P1 and the interface P2. The heartbeat packet carries a timeout value.

In the block, there are two links between the CB and the PE7, the two links are used to receive and send VCF data packets, it is necessary to appoint a timeout value for a link, so as to detect the usage of the link. Therefore, the heartbeat packets sent by the PE7 via the interfaces P1 and P2 carries a timeout value of each of the two links, for example, the timeout value may be 5 s, and so on.

In block 615, the CB respectively sets a timeout value for each of the interfaces C1 and C2, and returns a heartbeat acknowledge packet.

In the block, after receiving the heartbeat packet sent by the PE7 respectively via the interfaces C1 and C2, the CB extracts the timeout value carried in the heartbeat packet, and sets the timeout value of the links corresponding to the interfaces C1 and C2 as 5 s, returns a heartbeat acknowledge packet to the PE7 respectively via the interfaces C1 and C2.

So far the VCF system constituted by the CB and the PE7 is automatically built. The data transmission may be performed through the VCF link between the CB and the PE7.

In block 616, when a failure occurs on the VCF link between the interface C1 and the interface P1, the CB sets the interface state of the interface C1 as initial state, and removes the interface C1 from the downlink group; the PE7 sets the interface state of the interface P1 as blocked state, and performs the link negotiation.

Here, the failure occurred on the VCF link between the interface C1 and the interface P1 includes VCF link down or link handshake timeout, and the like. At this time, the CB may set the interface state of the interface C1 from forwarding state to initial state, namely unstart the VCF feature of the interface C1, and remove the interface C1 from the downlink group. The current member of the downlink group is {C2}. Simultaneously, the PE7 may sets interface state of the interface P1 as blocked state, and performs the link negotiation. Subsequently, blocks 610 to 615 will be performed repeatedly.

In an example, the CB and the PE may perform state settings of a link interface by automatically sending packets, not only a link supporting the VCF may be established, but also a link may be negotiated, thus the VCF system automatically built by the CB and the PE7 under zero configuration may be achieved, which is conductive to promote the improvement of the new generation of network device virtualization technology.

Figure 7:
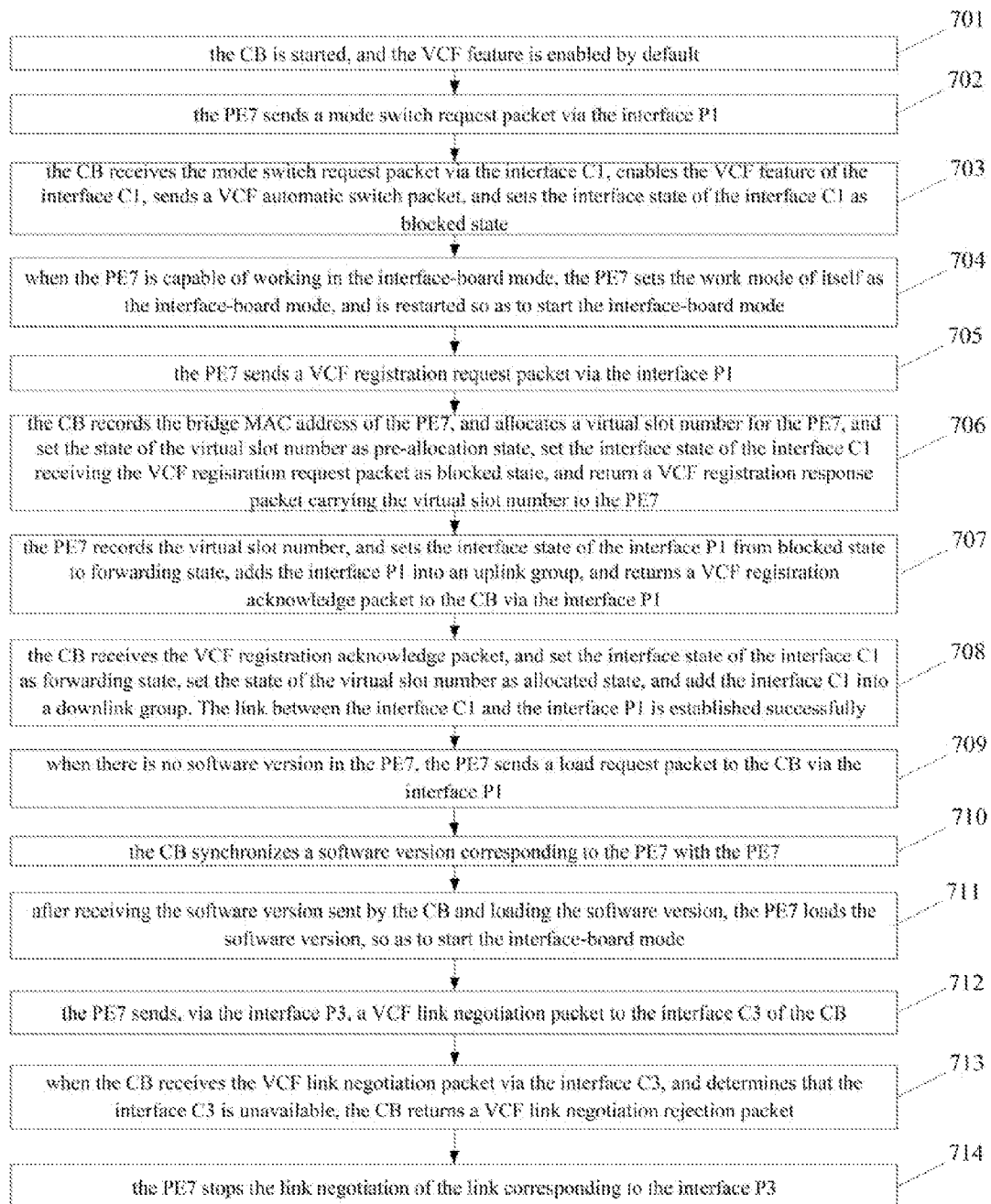
FIG. 7 is a flow diagram illustrating a method for building a VCF according to another example of the present disclosure.

In above mentioned first non-limiting example, it is taken as an example that there is a software version in the PE, and the interface-board mode is started. In a second non-limiting example, suppose there is no software version in the PE; in addition, the application environment in above mentioned first non-limiting example is still adopted, suppose the interface C3 of the CB is unavailable. FIG. 7 is a flow diagram illustrating a method for building a VCF according to another example of the present disclosure. The method may include the following operations.

The processing in blocks 701 to 708 is the same as that in blocks 601 to 608, no further descriptions will be provided hereinafter.

In block 709, when there is no software version in the PE7, the PE7 sends a load request packet to the CB via the interface P1.

In block 710, the CB synchronizes a software version corresponding to the PE7 with the PE7.

In the block, since the interface C is connected with the interface P1, the load request packet is received via the interface C1, and then the CB synchronizes a software version corresponding to the PE7 with the PE7.

In block 711, after receiving the software version sent by the CB, the PE7 loads the software version, so as to start the interface-board mode.

In block 712, the PE7 sends, via the interface P3, a VCF link negotiation packet to the interface C3 of the CB.

Since the interface-board mode has been started in block 711, and the VCF link between the interface P1 and the interface C1 has been established successfully, it is necessary to negotiate about other links supporting the VCF feature. In block 704, the interface states of all available interfaces supporting the VCF feature on the PE7 have defaulted to blocked states, and in block 607, the PE7 has obtained the virtual slot number 156 allocated by the CB, therefore, in block 610, the PE7 may send the VCF link negotiation packet carrying the bridge MAC address and the virtual slot number 156 used by the PE7 via an interface which is in blocked state. In the example, it is taken as an example that the link between the interface P3 and the interface C3 is negotiated, and the PE7 sends the VCF link negotiation packet to the interface C3 of the CB via the interface P3.

In block 713, when the CB receives the VCF link negotiation packet via the interface C3, and determines that the interface C3 is unavailable, the CB returns a VCF link negotiation rejection packet.

In the block, although the interface C3 of the CB receives the VCF link negotiation packet sent by the PE7, the interface C3 is unavailable, and the CB returns the VCF link negotiation rejection packet to the PE7 via the interface C3.

In block 714, the PE7 stops the link negotiation of the link corresponding to the interface P3.

In the block, when receiving the VCF link negotiation rejection packet sent by the CB, the PE7 knows that the interface C3 is unavailable, and stops negotiating the link between the interface C3 and the interface P3.

The technical solutions in the example, the method for building the VCF is described from the point of view that there is no software version in the PE, and the situation of link negotiation failure is also described.

Figure 8:
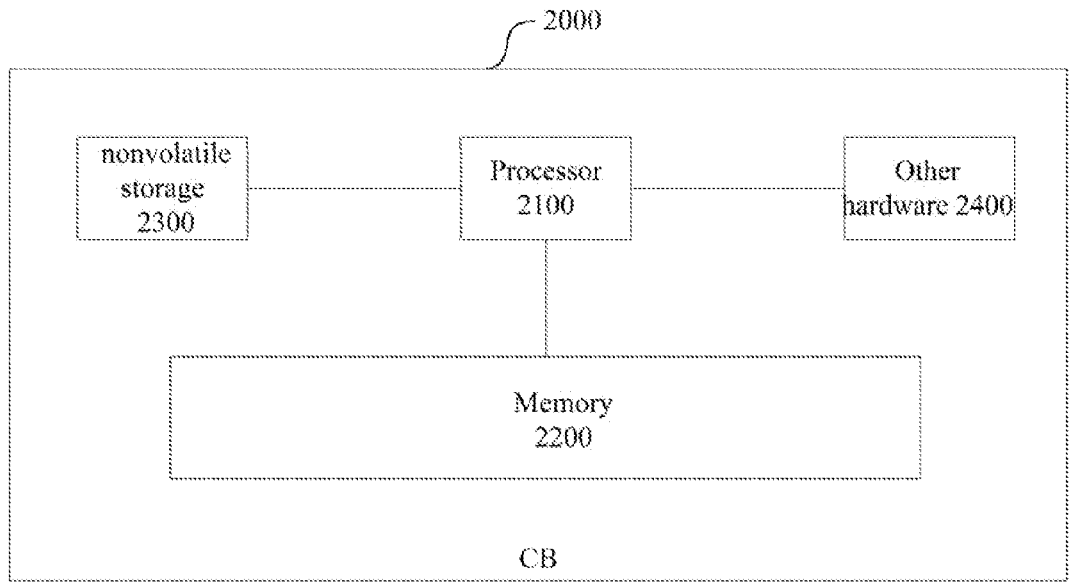
FIG. 8 is a schematic diagram illustrating hardware structure of a CB device according to various embodiments of the present disclosure.
Figure 9:
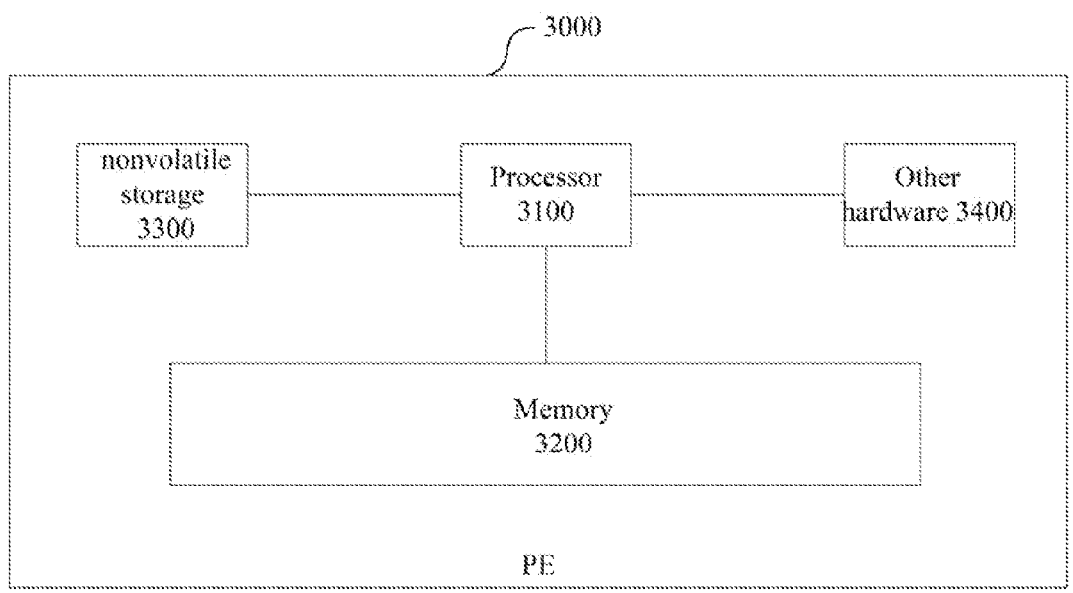
FIG. 9 is a schematic diagram illustrating hardware structure of a PE device according to various embodiments of the present disclosure.

The present disclosure also provides a CB device and a PE device, which are respectively shown in FIG. 8 and FIG. 9.

As shown in FIG. 8, the CB device 2000 includes a processor 2100, a memory 2200, a nonvolatile storage 2300 and other hardware 2400. The processor 2100, the memory 2200, the nonvolatile storage 2300 and other hardware 2400 may be interconnected by bus, namely the processor 2100 may have a communication connection with other components. The memory 2200 and nonvolatile storage 2300 are two examples of a non-transitory storage medium. The nonvolatile storage 2300 may store machine readable instructions for building a VCF. The processor 2100 may load the machine readable instructions stored in the nonvolatile storage 2300 into the memory 2200, and may run the machine readable instructions to generate corresponding computer executable instructions. The computer executable instructions may cause the processor 2100 to complete the functions performed by the CB described in above mentioned method for building a VCF.

As shown in FIG. 9, the PE device 3000 includes a processor 3100, a memory 3200, a nonvolatile storage 3300 and other hardware 3400. The processor 3100, the memory 3200, the nonvolatile storage 3300 and other hardware 3400 may be interconnected by bus, namely the processor 3100 may have a communication connection with other components. The nonvolatile storage 3300 may store machine readable instructions for building a VCF. The processor 3100 may load the machine readable instructions stored in the nonvolatile storage 3300 into the memory 3200, and may run the machine readable instructions to generate corresponding computer executable instructions. The computer executable instructions may cause the processor 3100 to complete the functions performed by the PE described in above mentioned method for building a VCF.

The methods and devices provided by examples of the present disclosure may be achieved by hardware, or a combination of hardware and machine-readable instructions. The machine-readable instructions may be stored, by at least one processor, in a non-transitory computer readable storage medium, such as a hard disk a floppy disk, a magnetic disk, compact disk (e.g., CD-ROM, CD-R, CD-RW, DVD-ROM, DVD-RAM, DVD-RW and DVD+RW), a tape, a nonvolatile memory card, ROM and other suitable storage device. Or part of the machine-readable instructions may be achieved by specific hardware, such as custom integrated circuits, gate arrays, FPGA, PLD, a computer of specific functions, etc.

Examples of the present disclosure also provide a computer readable storage medium, which is configured to store machine-readable instructions for making a computing device (may be a personal computer, a server, a network device, etc.,) execute the method of the examples. Specifically, the system and device provided by the examples of the present disclosure all include a computer readable storage medium, which stores machine-readable program codes for achieving functions of above mentioned examples. The system and device (or CPU or MPU) may read out and execute the machine-readable program codes stored in the computer readable storage medium.

In this case, the program codes read from the computer readable storage medium can achieve anyone of above mentioned examples. Therefore, the program codes and the storage medium storing the program codes are a part of technical solutions of the present disclosure.

Examples of non-transitory storage medium for providing program codes includes a hard disk, a floppy disk, a magnetic disk, compact disk (e.g., CD-ROM, CD-R, CD-RW, DVD-ROM, DVD-RAM, DVD-RW and DVD+RW), a tape, a Flash card, ROM, and so on. Further, it is possible to download the program codes from a server computer via a communication network.

It should be noted that, for the program codes being executed by a computer, a part of or all of operations achieved by the program codes may be implemented by an operating system running on a computer, so as to achieve technical solutions of anyone of example mentioned above. The computer executes instructions based on the program codes.

The program codes in the storage medium are written in a memory, and the memory is located in an extended board inside a computer, or in an extended unit connected with a computer. In the example, a CPU on the extended board or the extended unit executes a part of or all of the actual operations based on the program codes, so as to realize technical solutions of any of the aforementioned embodiments.

The foregoing description, for purpose of explanation, has been described with reference to specific examples. However, the illustrative discussions above are not intended to be exhaustive or to limit the present disclosure to the precise forms disclosed. Many modifications and variations are possible in view of the above teachings. The examples were chosen and described in order to best explain the principles of the present disclosure and its practical applications, to thereby enable others skilled in the art to best utilize the present disclosure and various examples with various modifications as are suited to the particular use contemplated.

What is claimed is:

1. A method for building a Vertical Converged Framework, VCF, comprising:
   receiving, by a Controlling Bridge, CB, a VCF registration request packet sent by a Port Extender, PE;
   setting, by the CB, interface state of a VCF interface receiving the VCF registration request packet from initial state to blocked state;
   returning, by the CB, a VCF registration response packet to the PE;
   receiving, by the CB, a VCF registration acknowledge packet returned by the PE after the PE receives the VCF registration response packet and sets interface state of a VCF interface sending the VCF registration request packet from blocked state to forwarding state; and
   setting, by the CB, interface state of the VCF interface receiving the VCF registration request packet as forwarding state, and establishing successfully a VCF link with the PE.

2. The method according to claim 1, wherein before receiving the VCF registration request packet, further comprising:
   receiving, by the CB, a mode switch request packet via the VCF interface receiving the VCF registration request packet and being in initial state; where the mode switch request packet is sent by the PE via the VCF interface sending the VCF registration request packet;
   enabling, by the CB, a VCF feature of the VCF interface receiving the VCF registration request packet;
   setting, by the CB, the interface state of the VCF interface receiving the VCF registration request packet from initial state to blocked state; and
   returning, by the CB, a VCF automatic switch packet to the PE, so that the PE may be restarted and work in interface-board mode, and set interface state of the VCF interface sending the VCF registration request packet to blocked state by default.

3. The method according to claim 1, further comprising:
   when negotiating with the PE about another VCF link, receiving, by the CB, a VCF link negotiation packet sent by the PE;
   enabling, by the CB, a VCF feature of a VCF interface receiving the VCF link negotiation packet;
   setting, by the CB, interface state of the VCF interface receiving the VCF link negotiation packet from initial state to blocked state;
   sending, by the CB, a VCF link addition packet to the PE;
   receiving, by the CB, a VCF link addition acknowledge packet returned by the PE after the PE sets interface state of the VCF interface sending the VCF link negotiation packet from blocked state to forwarding state according to the VCF link addition packet; and
   setting, by the CB, interface state of the VCF interface receiving the VCF link negotiation packet as forwarding state, and establishing successfully another VCF link with the PE.

4. A method for building a Vertical Converged Framework, VCF, comprising:
   sending, by a Port Extender, PE, a VCF registration request packet to a Controlling Bridge, CB;
   receiving, by the PE, a VCF registration response packet returned by the CB after the CB receives the VCF registration request packet and sets interface state of a VCF interface receiving the VCF registration request packet from initial state to blocked state;
   setting, by the PE, interface state of a VCF interface sending the VCF registration request packet from blocked state to forwarding state; and
   sending, by the PE, a VCF registration acknowledge packet to the CB, so that the CB sets interface state of the VCF interface receiving the VCF registration request packet as forwarding state; establishing successfully a VCV link with the CB.

5. The method according to claim 4, before sending the VCF registration request packet, further comprising:
   sending, by the PE, a mode switch request packet to the CB via the VCF interface sending the VCF registration request packet;
   receiving, by the PE, a VCF automatic switch packet returned by the CB after the CB receives the mode switch request packet via the VCF interface receiving the VCF registration request packet, enables a VCF feature of the VCF interface receiving the VCF registration request packet, and sets interface state of the VCF interface receiving the VCF registration request packet from initial state to blocked state;
   working, by the PE, in interface-board state after the PE is restarted, and setting, by the PE, interface state of the VCF interface sending the VCF registration request packet as blocked state by fault.

6. The method according to claim 4, further comprising:
   when negotiating with the CB about another VCF link, sending, by the PE, a VCF link negotiation packet to the CB;
   receiving, by the PE, a VCF link addition packet returned by the CB after the CB receives the VCF link negotiation packet, enables a VCF feature of a VCF interface receiving the VCF link negotiation packet and sets interface state of the VCF interface receiving the VCF link negotiation packet from initial state to blocked state;
   setting, by the PE, interface state of the VCF interface sending the VCF link negotiation packet from blocked state to forwarding state; and
   sending, by the PE, a VCF link addition acknowledge packet to the CB, so that the CB sets interface state of the VCF interface receiving the VCF link negotiation packet as forwarding state, and establishing successfully another VCF link with the CB.

7. A Controlling Bridge, CB, comprising: a processor and a non-transitory machine readable storage medium storing instructions which are executable by the processor to:
   receive a VCF registration request packet sent by a Port Extender, PE;
   set interface state of a VCF interface receiving the VCF registration request packet from initial state to blocked state;
   return a VCF registration response packet to the PE;
   receive a VCF registration acknowledge packet returned by the PE after the PE receives the VCF registration response packet and sets interface state of a VCF interface sending the VCF registration request packet from blocked state to forwarding state;
   set interface state of the VCF interface receiving the VCF registration request packet as forwarding state, and establish successfully a VCF link with the PE.

8. The CB according to claim 7, wherein before receiving the VCF registration request packet, the processor is further to:
   receive a mode switch request packet via the VCF interface receiving the VCF registration request packet and being in initial state; where the mode switch request packet is sent by the PE via the VCF interface sending the VCF registration request packet;
enable a VCF feature of the VCF interface receiving the VCF registration request packet;
set the interface state of the VCF interface receiving the VCF registration request packet from initial state to blocked state; and
return a VCF automatic switch packet to the PE, so that the PE may be restarted and work in interface-board mode, and set interface state of the VCF interface sending the VCF registration request packet to blocked state by default.

9. The CB according to claim 7, wherein the processor is further to:
when negotiating with the PE about another VCF link, receive a VCF link negotiation packet sent by the PE;
enable a VCF feature of a VCF interface receiving the VCF link negotiation packet;
set interface state of the VCF interface receiving the VCF link negotiation packet from initial state to blocked state;
send a VCF link addition packet to the PE;
receive a VCF link addition acknowledge packet returned by the PE after the PE sets interface state of the VCF interface sending the VCF link negotiation packet from blocked state to forwarding state according to the VCF link addition packet; and
set interface state of the VCF interface receiving the VCF link negotiation packet as forwarding state, and establish successfully another VCF link with the PE.

10. A Port Extender, PE, comprising: a processor and a non-transitory machine readable storage medium storing instructions which are executable by the processor to:
send a VCF registration request packet to a Controlling Bridge, CB;
receive a VCF registration response packet returned by the CB after the CB receives the VCF registration request packet and sets interface state of a VCF interface receiving the VCF registration request packet from initial state to blocked state;
set interface state of a VCF interface sending the VCF registration request packet from blocked state to forwarding state; and
send a VCF registration acknowledge packet to the CB, so that the CB sets interface state of the VCF interface receiving the VCF registration request packet as forwarding state; establish successfully a VCV link with the CB.

11. The PE according to claim 10, wherein before sending the VCF registration request packet, the processor is further to:
send a mode switch request packet to the CB via the VCF interface sending the VCF registration request packet;
receive a VCF automatic switch packet returned by the CB after the CB receives the mode switch request packet via the VCF interface receiving the VCF registration request packet, enables a VCF feature of the VCF interface receiving the VCF registration request packet, and sets interface state of the VCF interface receiving the VCF registration request packet from initial state to blocked state;
work in interface-board state after the PE is restarted, and set interface state of the VCF interface sending the VCF registration request packet as blocked state by fault.

12. The PE according to claim 10, wherein the processor is further to:
when negotiating with the CB about another VCF link, send a VCF link negotiation packet to the CB;
receive a VCF link addition packet returned by the CB after the CB receives the VCF link negotiation packet, enables a VCF feature of a VCF interface receiving the VCF link negotiation packet and sets interface state of the VCF interface receiving the VCF link negotiation packet from initial state to blocked state;
set interface state of the VCF interface sending the VCF link negotiation packet from blocked state to forwarding state;
send a VCF link addition acknowledge packet to the CB, so that the CB sets interface state of the VCF interface receiving the VCF link negotiation packet as forwarding state, and establish successfully another VCF link with the CB.

* * * * *